United States Patent
Hasegawa

(10) Patent No.: US 10,257,376 B2
(45) Date of Patent: Apr. 9, 2019

(54) COMMUNICATION SYSTEM CAPABLE OF REDUCING POWER CONSUMPTION, IMAGE FORMING APPARATUS, AND METHOD OF CONTROLLING IMAGE FORMING APPARATUS

(71) Applicant: CANON KABUSHIKI KAISHA, Tokyo (JP)

(72) Inventor: Teppei Hasegawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/000,262

(22) Filed: Jan. 19, 2016

(65) Prior Publication Data

US 2016/0212288 A1 Jul. 21, 2016

(30) Foreign Application Priority Data

Jan. 21, 2015 (JP) .................................. 2015-009478

(51) Int. Cl.
    G06F 3/00 (2006.01)
    H04N 1/00 (2006.01)
    G06F 3/12 (2006.01)

(52) U.S. Cl.
    CPC ....... *H04N 1/00891* (2013.01); *G06F 3/1221* (2013.01); *G06F 3/1229* (2013.01);
    (Continued)

(58) Field of Classification Search
    None
    See application file for complete search history.

(56) References Cited

U.S. PATENT DOCUMENTS 7,586,637 B2 * 9/2009 Eastment ................. B41J 29/38
                                                 358/1.16
8,711,388 B2 * 4/2014 Lee ..................... G03G 15/5004
                                                 358/1.14
(Continued)

FOREIGN PATENT DOCUMENTS

| CN | 1678010 A | 10/2005 |
| JP | 2009043243 A | 2/2009 |
| JP | 2015001818 A | 1/2015 |

OTHER PUBLICATIONS

Extended European Search Report issued in European Application No. EP16152068.9 dated Jun. 10, 2016.
(Continued)

*Primary Examiner* — Barbara D Reinier
(74) *Attorney, Agent, or Firm* — Rossi, Kimms & McDowell LLP

(57) ABSTRACT

A communication system capable of more efficiently reducing power consumption. The communication system causes a DFE to shift from a power-saving mode to a normal mode based on a notification received from an MFP. A CPU of the MFP identifies a factor having caused the MFP to return from a power-saving mode to a normal mode. The CPU determines based on the identified factor whether or not to cause the DFE to shift from the power-saving mode to the normal mode. The CPU notifies, based on determination to cause the DFE to shift from the power-saving mode to the normal mode, an instruction for causing the DFE to shift from the power-saving mode to the normal mode, to the DFE. The DFE shifts from the power-saving mode to the normal mode, based on the notification of the instruction.

6 Claims, 7 Drawing Sheets

(52) U.S. Cl.
 CPC ......... *G06F 3/1285* (2013.01); *H04N 1/0032* (2013.01); *H04N 1/00204* (2013.01); *H04N 1/00413* (2013.01); *H04N 2201/0094* (2013.01); *Y02D 10/1592* (2018.01)

(56) References Cited

U.S. PATENT DOCUMENTS

| | | | |
|---|---|---|---|
| 2014/0063526 A1 | 3/2014 | Yamakawa | |
| 2014/0146341 A1* | 5/2014 | Goda | G06K 15/4085 358/1.14 |
| 2014/0185077 A1* | 7/2014 | Tashiro | G03G 15/5016 358/1.13 |
| 2014/0368862 A1* | 12/2014 | Ooba | G06F 3/1221 358/1.14 |
| 2015/0012769 A1 | 1/2015 | Koga | |

OTHER PUBLICATIONS

Office Action issued in Chinese Application No. 201610037169.3 dated May 4, 2018. English translation provided.
Office Action issued in European Appln. No. 16152068.9 dated Jun. 29, 2018.

\* cited by examiner

FIG. 6

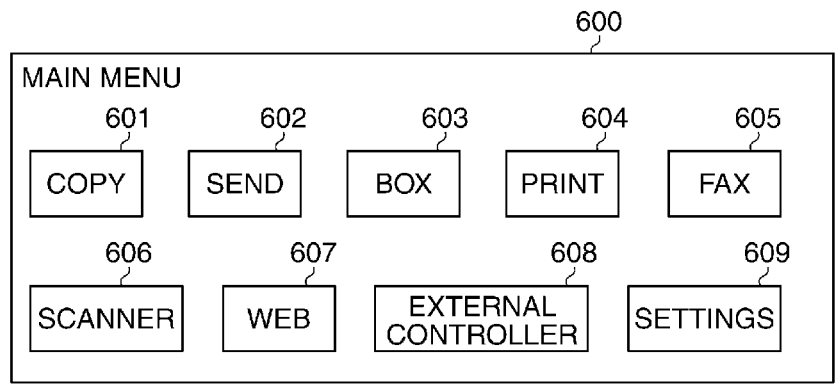

FIG. 7

| ITEM | SETTING OF WHETHER TO TRANSMIT RETURN INSTRUCTION NOTIFICATION TO DFE |
|---|---|
| COPY | DO NOT TRANSMIT RETURN INSTRUCTION NOTIFICATION |
| SEND | TRANSMIT RETURN INSTRUCTION NOTIFICATION |
| BOX | DO NOT TRANSMIT RETURN INSTRUCTION NOTIFICATION |
| PRINT | DO NOT TRANSMIT RETURN INSTRUCTION NOTIFICATION |
| FAX | DO NOT TRANSMIT RETURN INSTRUCTION NOTIFICATION |
| SCANNER | DO NOT TRANSMIT RETURN INSTRUCTION NOTIFICATION |
| WEB | TRANSMIT RETURN INSTRUCTION NOTIFICATION |
| DISPLAY OF EXTERNAL CONTROLLER STATUS SCREEN | TRANSMIT RETURN INSTRUCTION NOTIFICATION |
| SET | DO NOT TRANSMIT RETURN INSTRUCTION NOTIFICATION |

COMMUNICATION SYSTEM CAPABLE OF REDUCING POWER CONSUMPTION, IMAGE FORMING APPARATUS, AND METHOD OF CONTROLLING IMAGE FORMING APPARATUS

BACKGROUND OF THE INVENTION

Field of the Invention

The present invention relates to a communication system, an image forming apparatus, and a method of controlling the image forming apparatus, and more particularly to a communication system that controls supply of electric power, an image forming apparatus, and a method of controlling the image forming apparatus.

Description of the Related Art

There has been known a communication system in which a client PC and a digital front end (hereinafter referred to as the "DFE") as an image processing apparatus are connected to each other via a network, and the DFE and an MFP (Multifunction Peripheral) as an image forming apparatus are connected to each other via a network. In the communication system, instructions for performing various kinds of processing, such as a print instruction for executing print processing, are transmitted from the client PC. For example, when the print instruction is transmitted from the client PC, the DFE generates print data for executing the print processing based on the print instruction, and transmits the generated print data to the MFP. The MFP executes the print processing based on the transmitted print data. During a time period over which such processing is not performed, in order to reduce power consumption of the whole communication system, the DFE and the MFP shift to a power-saving mode in which power consumption can be reduced than in a normal mode for performing the various kinds of processing. Upon shifting to the power-saving mode, the DFE and the MFP each supply electric power only to minimum necessary components provided therein. Each of the DFE and the MFP having shifted to the power-saving mode returns from the power-saving mode to the normal mode e.g. in response to a user operation of a console section thereof.

Here, it is desired that the DFE and the MFP speedily return from the power-saving mode to the normal mode, and to realize the speedy return from the power-saving mode to the normal mode, there has been known, for example, a technique in which as soon as the MFP returns from the power-saving mode to the normal mode, the DFE is caused to return from the power-saving mode to the normal mode in an interlocked manner (see e.g. Japanese Patent Laid-Open Publication No. 2009-043243).

However, in the technique disclosed in Japanese Patent Laid-Open Publication No. 2009-043243, there occur cases where the DFE is unnecessarily caused to return from the power-saving mode to the normal mode. For example, when a user operates the MFP to perform copy processing or FAX processing, thereby causing the MFP to return from the power-saving mode to the normal mode, it is possible to perform the copy processing or the FAX processing using only the MFP without performing data communication with the DFE, but in this case as well, the DFE is caused to return from the power-saving mode to the normal mode in a manner interlocked with the return of the MFP. This results in hindrance to the reduction of power consumption.

SUMMARY OF THE INVENTION

The present invention provides a communication system capable of more efficiently reducing power consumption, an image forming apparatus, and a method of controlling the image forming apparatus.

In a first aspect of the present invention, there is provided a communication system that includes an image forming apparatus and an image processing apparatus, the image forming apparatus and the image processing apparatus each having a normal mode and a power-saving mode, and causes the image processing apparatus to shift from the power-saving mode to the normal mode based on notification received from the image forming apparatus, the communication system comprising an identification unit configured to identify a factor that has caused the image forming apparatus to shift from the power-saving mode to the normal mode, a determination unit configured to determine based on an identified factor whether or not to cause the image processing apparatus to shift from the power-saving mode to the normal mode, and a notification unit configured to perform, based on determination by the determination unit to cause the image processing apparatus to shift from the power-saving mode to the normal mode, notification of an instruction for causing the image processing apparatus to shift from the power-saving mode to the normal mode, to the image processing apparatus, wherein the image processing apparatus shifts from the power-saving mode to the normal mode, based on the notification of the instruction.

In a second aspect of the present invention, there is provided an image forming apparatus that performs data communication with an image processing apparatus having a normal mode and a power-saving mode, and includes a normal mode and a power-saving mode, comprising an identification unit configured to identify a factor that has caused the image forming apparatus to shift from the power-saving mode to the normal mode, a determination unit configured to determine based on an identified factor whether or not to cause the image processing apparatus to shift from the power-saving mode to the normal mode, and a notification unit configured to perform, based on determination by the determination unit to cause the image processing apparatus to shift from the power-saving mode to the normal mode, notification of an instruction for causing the image processing apparatus to shift from the power-saving mode to the normal mode, to the image processing apparatus.

In a third aspect of the present invention, there is provided a method of controlling an image forming apparatus that performs data communication with an image processing apparatus having a normal mode and a power-saving mode, and includes a normal mode and a power-saving mode, comprising identifying a factor that has caused the image forming apparatus to shift from the power-saving mode to the normal mode, determining based on an identified factor whether or not to cause the image processing apparatus to shift from the power-saving mode to the normal mode, and performing, based on determination by said determining to cause the image processing apparatus to shift from the power-saving mode to the normal mode, notification of an instruction for causing the image processing apparatus to shift from the power-saving mode to the normal mode, to the image processing apparatus.

According to the present invention, it is possible to more efficiently reduce power consumption.

Further features of the present invention will become apparent from the following description of exemplary embodiments (with reference to the attached drawings).

BRIEF DESCRIPTION OF THE DRAWINGS

FIG. 6 is a diagram useful in explaining an operation screen displayed on a console section of the MFP.

FIG. 7 is a diagram useful in explaining transmission setting information used in the return instruction transmission process shown in FIG. 5.

DESCRIPTION OF THE EMBODIMENTS

The present invention will now be described in detail below with reference to the accompanying drawings showing embodiments thereof.

Although in the present embodiment, a description will be given of a case where the present invention is applied to a communication system including an MFP as an image forming apparatus and a DFE as an image processing apparatus, the present invention can be applied not only to the communication system including the MFP and the DFE but also to any suitable communication system insofar as it is comprised of a plurality of apparatuses capable of communicating information concerning return from a power-saving mode to a normal mode there between.

Figure 1:
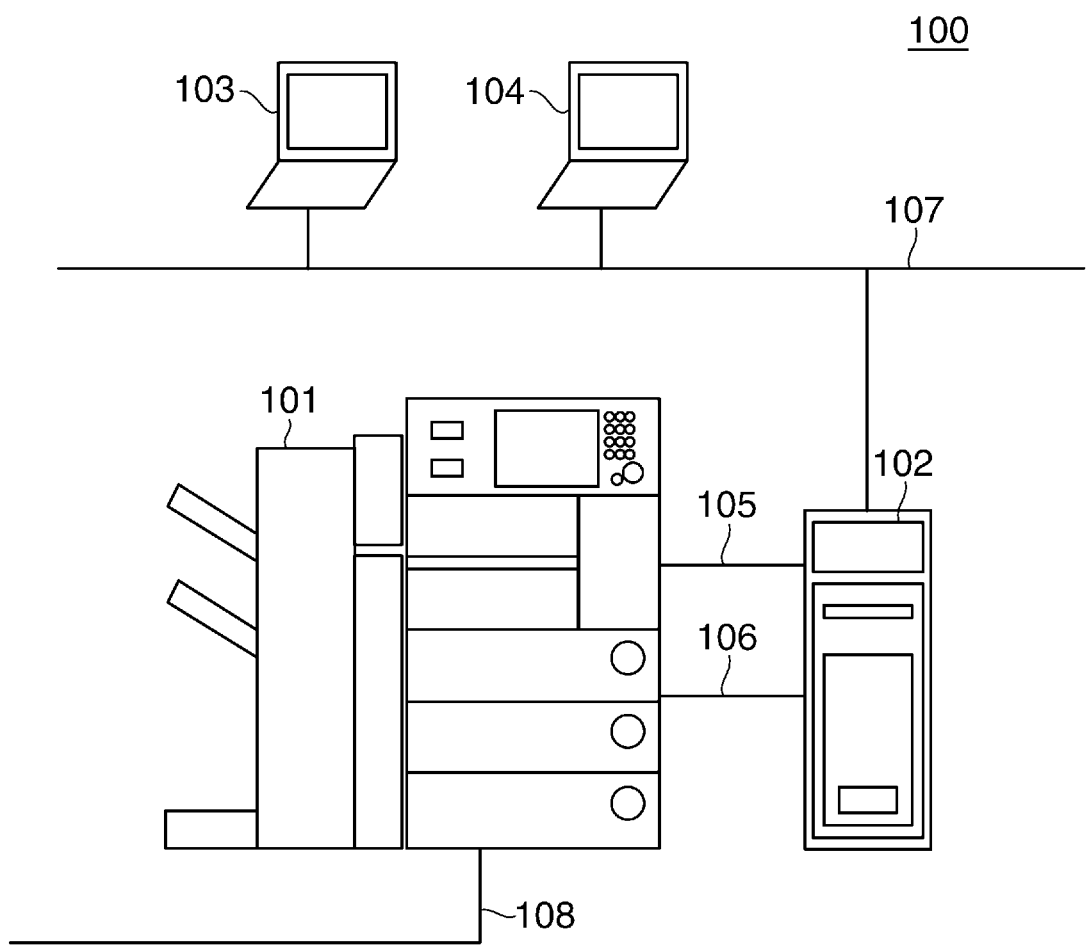
FIG. 1 is a schematic block diagram of a communication system including an MFP, according to an embodiment of the present invention.

FIG. 1 is a schematic block diagram of the communication system, denoted by reference numeral 100, including the MFP, denoted by reference numeral 101, according to an embodiment of the present invention.

Referring to FIG. 1, the communication system 100 includes the MFP 101 (image forming apparatus), the DFE 102 (image processing apparatus), and clients PCs 103 and 104. The MFP 101 is connected to the DFE 102 via an internal LAN 105 and a video cable 106, and the DFE 102 is connected to the clients PCs 103 and 104 via an external LAN 107.

In the communication system 100, the clients PCs 103 and 104 are not directly connected to the MFP 101, and data communication is performed between the clients PCs 103 and 104 and the MFP 101 via the DFE 102. Let it be assumed, for example, that one of the clients PCs 103 and 104 transmits instruction data for instructing execution of print processing to the DFE 102. The DFE 102 performs image processing based on the received instruction data to thereby generate print data for executing the print processing (execution data), and transmits the generated print data to the MFP 101. The MFP 101 performs the print processing based on the received print data. Further, the MFP 101 performs copy processing, and FAX processing via a telephone line 108, based on settings configured by operating a console section 201, described hereinafter, of the MFP 101, without receiving input information, such as print data, from the DFE 102. In the present embodiment, each of the MFP 101 and the DFE 102 has a normal mode for performing various kinds of processing, and a power-saving mode in which power consumption can be reduced than in the normal mode. During a time period over which none of the various kinds of processing are performed, the MFP 101 and the DFE 102 shift from the normal mode to the power-saving mode in order to reduce power consumption. In the power-saving mode, electric power is supplied only to minimum necessary components for maintaining the respective systems of the MFP 101 and DFE 102.

Figure 2:
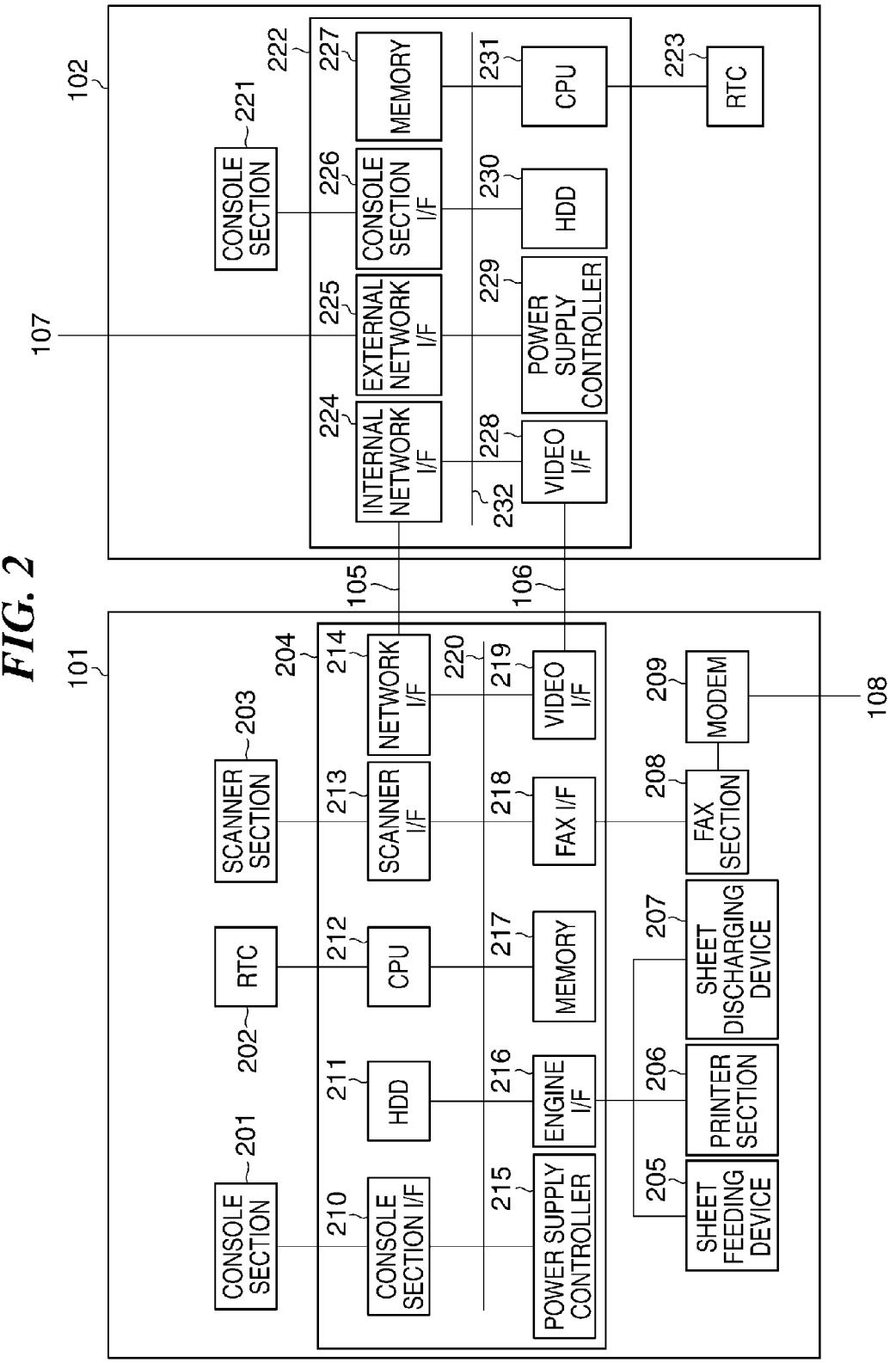
FIG. 2 is a schematic block diagram of the MFP and a DFE appearing in FIG. 1.

FIG. 2 is a schematic block diagram of the MFP 101 and DFE 102 appearing in FIG. 1.

Referring to FIG. 2, the MFP 101 is comprised of the console section 201, a RTC (Real Time Clock) 202, a scanner section 203, an MFP controller 204, a sheet feeding device 205, a printer section 206, a sheet discharging device 207, a FAX section 208, and a modem 209. The MFP controller 204 includes a console section interface 210, an HDD 211, a CPU 212, a scanner interface 213, a network interface 214, a power supply controller 215, an engine interface 216, a memory 217, a FAX interface 218, and a video interface 219, as components. These components are connected to each other via a system bus 220. The console section 201 is connected to the console section interface 210, and the RTC 202 is connected to the CPU 212. Further, the scanner section 203 is connected to the scanner interface 213, while the sheet feeding device 205, the printer section 206, the sheet discharging device 207, and the engine interface 216 are connected to each other. The FAX section 208 is connected to the FAX interface 218 and the modem 209.

The DFE 102 includes a console section 221, a DFE controller 222, and a RTC 223. The DFE controller 222 includes an internal network interface 224, an external network interface 225, a console section interface 226, a memory 227, a video interface 228, a power supply controller 229, an HDD 230, and a CPU 231, as components. These components are connected to each other via a system bus 232.

The console section 201 of the MFP 101 includes operation buttons (not shown) and a display panel (not shown). The console section 201 transmits various kinds of setting information set by a user operation of the operation buttons to the CPU 212, and displays various information concerning a printing status and the like on the display panel based on control signals transmitted from the CPU 212. The RTC 202 counts time based on a control signal transmitted from the CPU 212, and when a time period set by the control signal has elapsed, notifies the CPU 212 of the fact. In the present embodiment, the MFP 101 has a timer function, and makes a setting of an execution reservation such that an associated one of the various kinds of processing is executed after the lapse of the set time period. When the set time period has elapsed, the RTC 202 transmits to the CPU 212 a timer interrupt notification for causing the processing reserved for execution to be performed. Note that a power supply path to the RTC 202 is different from a power supply path to each component of the MFP 101 other than the RTC 202, and electric power is supplied to the RTC 202 from a battery (not shown) disposed in the MFP 101. The scanner section 203 reads image information from an original disposed on an original platen glass (not shown) based on scan job setting data for performing scan processing, which is transmitted from the CPU 212, and generates scan image data based on the read image information. The sheet feeding device 205 stores sheets as recording paper for use in print processing, and feeds the stored sheets to the printer section 206. The printer section 206 performs printing on each sheet fed from the sheet feeding device 205 based on print job data for performing the print processing, which is transmitted from the CPU 212. In the present embodiment, the printer section 206 performs copy processing by printing the scan image data generated by the scanner section 203, on each sheet fed from the sheet feeding device 205. Further, the printer section 206 performs print processing by printing image data, described hereinafter, included in print data obtained from the internal network interface 224 of the DFE 102 via the network interface 214, on each sheet fed from the sheet feeding device 205. The sheet discharging device 207 performs post-processing, such as sorting, stapling, punching, and trimming, on sheets printed by the printer section 206, and discharges the sheets subjected to the post-processing into a discharge tray (not shown). The FAX section 208 performs facsimile communication with an apparatus which is connected to the telephone line 108 via the modem 209 and capable of performing facsimile communication.

The MFP controller 204 performs centralized control of the overall operation of the MFP 101. The console section interface 210 performs data communication with the console section 201. The HDD 211 is a large-capacity storage device, and stores various programs. The CPU 212 executes the various programs stored in the HDD 211, and transmits control signals to the components connected to the MFP controller 204, for controlling the components. The scanner interface 213 performs data communication with the scanner section 203. The network interface 214 performs data communication with the internal network interface 224 of the DFE 102 via the internal LAN 105. For example, the network interface 214 obtains print data including image data for use in print processing from the internal network interface 224. Further, the network interface 214 transmits an instruction notification for causing the DFE 102 to return from the power-saving mode to the normal mode (hereinafter referred to as the "return instruction notification") to the internal network interface 224. The power supply controller 215 controls supply of electric power from an AC power supply 304 in FIG. 3, referred to hereinafter, to the components of the MFP 101. The engine interface 216 performs data communication with each of the sheet feeding device 205, the printer section 206, and the sheet discharging device 207. The memory 217 is used as a work area for the CPU 212. The FAX interface 218 performs data communication with the FAX section 208. The video interface 219 performs data communication with the video interface 228 of the DFE 102 via the video cable 106. In the present embodiment, the video interface 219 transmits information indicative of a power supply state of the MFP 101 (hereinafter referred to as the "power supply state information), for example, information indicating which of the power-saving mode, the normal mode, and a power-off state, the MFP 101 is in.

The console section 221 of the DFE 102 includes operation buttons (not shown) and a display panel (not shown). The console section 221 transmits various kinds of setting information set by a user operation of the operation buttons to the CPU 231, and displays various information on the display panel based on control signals transmitted from the CPU 231. The RTC 223 counts time based on a control signal transmitted from the CPU 231, and when a time period set based on the control signal has elapsed, notifies the CPU 231 of the fact. Note that a power supply path to the RTC 223 is different from a power supply path to each component of the DFE 102 other than the RTC 223, and electric power is supplied to the RTC 223 from a battery (not shown) disposed in the DFE 102. The DFE controller 222 performs centralized control of the overall operation of the DFE 102. The internal network interface 224 performs data communication with the network interface 214 of the MFP 101 via the internal LAN 105. The external network interface 225 receives e.g. instruction data for instructing execution of print processing from each of the client PCs 103 and 104 via the external LAN 107. The console section interface 226 performs data communication with the console section 221. The memory 227 is used as a work area for the CPU 231. The video interface 228 performs data communication with the video interface 219 of the MFP 101 via the video cable 106. In the present embodiment, for example, when the DFE 102 in the normal mode determines that the MFP 101 is in the power-saving mode, based on the power supply state information of the MFP 101 obtained from the video interface 219, the DFE 102 shifts from the normal mode to the power-saving mode in an interlocked manner in accordance the mode of the MFP 101. The power supply controller 229 controls supply of electric power from an AC power supply 402 in FIG. 4, referred to hereinafter, to the components of the DFE 102. The HDD 230 is a large-capacity storage device, and stores various programs. The CPU 231 executes the various programs stored in the HDD 230, and transmits control signals to the components connected to the DFE controller 222, for controlling the components.

Next, a description will be given of power supply control processes performed by the MFP 101 and the DFE 102, respectively.

Figure 3:
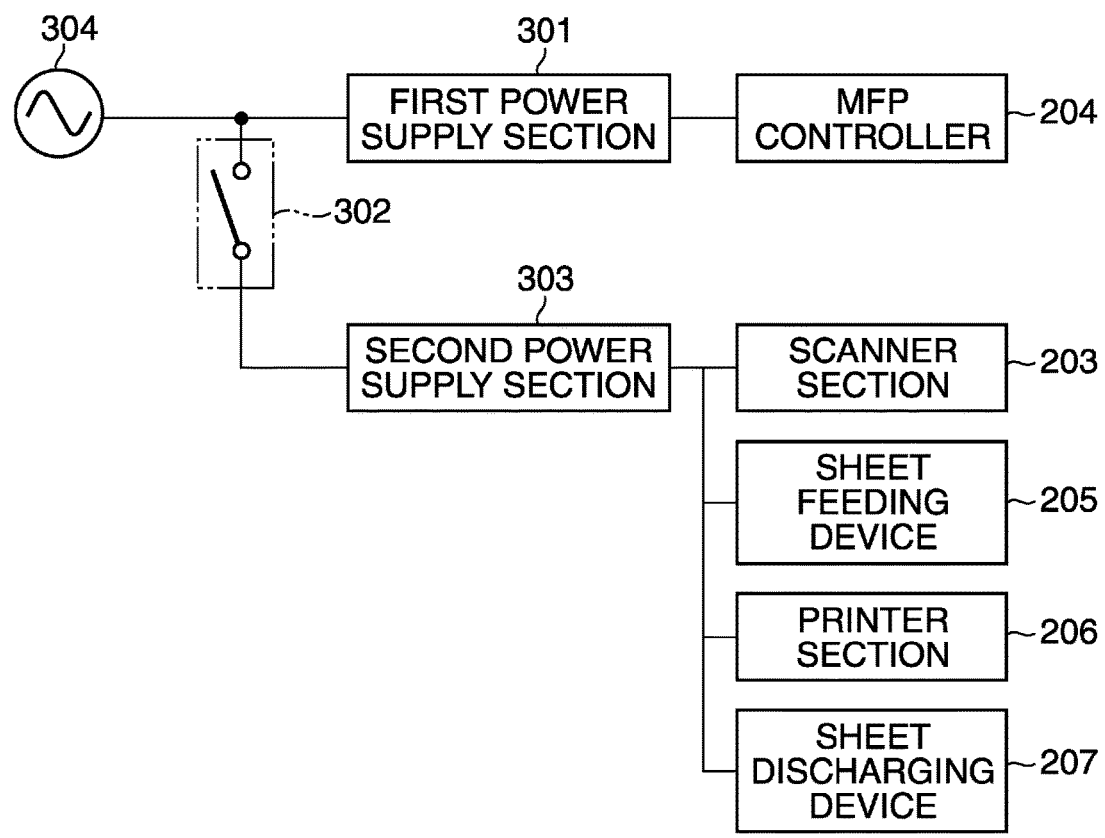
FIG. 3 is a diagram useful in explaining a power supply control process performed by a power supply controller of the MFP appearing in FIG. 2.

FIG. 3 is a diagram useful in explaining a power supply control process performed by the power supply controller 215 of the MFP 101 appearing in FIG. 2.

Referring to FIG. 3, the MFP 101 includes a first power supply section 301, a switch 302, and a second power supply section 303.

In the MFP 101, AC power is supplied from the AC power supply 304, such as an external receptacle, to the first power supply section 301 as well as to the second power supply section 303 via the switch 302. The first power supply section 301 converts the supplied AC power to DC power e.g. of 3.3 V, and supplies the DC power to some of the components of the MFP 101, including the MFP controller 204, which are used in both the normal mode and the power-saving mode. Further, the second power supply section 303 converts the supplied AC power to DC power e.g. of 12 or 24 V, and supplies the DC power to others of the components of the MFP 101, including the scanner section 203, the sheet feeding device 205, the printer section 206, and the sheet discharging device 207, which are used only in the normal mode. The switch 302 is subjected to on/off control based on a control signal from the power supply controller 215 of the MFP 101. That is, in the present embodiment, the power supply controller 215 controls the power supply to the components which operate only in the normal mode.

Figure 4:
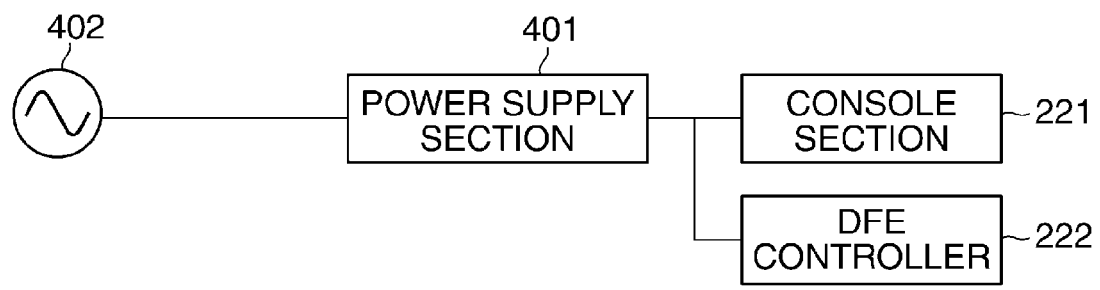
FIG. 4 is a diagram useful in explaining a power supply control process performed by a power supply controller of the DFE appearing in FIG. 2.

FIG. 4 is a diagram useful in explaining a power supply control process performed by the power supply controller 229 of the DFE 102 appearing in FIG. 2.

Referring to FIG. 4, the DFE 102 includes a power supply section 401. In the DFE 102, AC power is supplied from the AC power supply 402, such as an external receptacle, to the power supply section 401, and the power supply section 401 converts the supplied AC power to DC power e.g. of 3.3 V. The power supply section 401 supplies the DC power to components of the DFE 102, including the console section 221 and the DFE controller 222. The power supply controller 229 of the DFE 102 controls the power supply from the power supply section 401 to the components of the DFE 102. In the present embodiment, when the DFE 102 is in the power-saving mode, the power supply controller 229 causes electric power to be supplied only to components which are used in the power-saving mode, such as the internal network interface 224, the memory 227, the video interface 228, the HDD 230, and the CPU 231.

Next, a description will be given of processes for causing the MFP 101 and the DFE 102 to return from the power-saving mode to the normal mode.

In the communication system 100 in which the power mode of the DFE 102 is shifted based on the power supply state information of the MFP 101 obtained via the video cable 106, for example, when a user performs an operation for causing the MFP 101 to perform copy processing or facsimile communication, to thereby cause the MFP 101 to return from the power-saving mode to the normal mode, the copy processing or the facsimile communication can be performed by the MFP 101 alone without performing data communication with the DFE 102. In this case, assuming that the DFE 102 is caused to return from the power-saving mode to the normal mode based on the return instruction notification in an interlocked manner in accordance with the return of the MFP 101, it is sometimes impossible to reduce power consumption.

To eliminate this inconvenience, in the present embodiment, a return factor which has caused the MFP 101 to shift from the power-saving mode to the normal mode is identified, and if the identified return factor corresponds to an item for which a setting is made so as not to transmit the return instruction notification to the DFE 102, the return instruction notification is not transmitted from the MFP 101 to the DFE 102.

Figure 5:
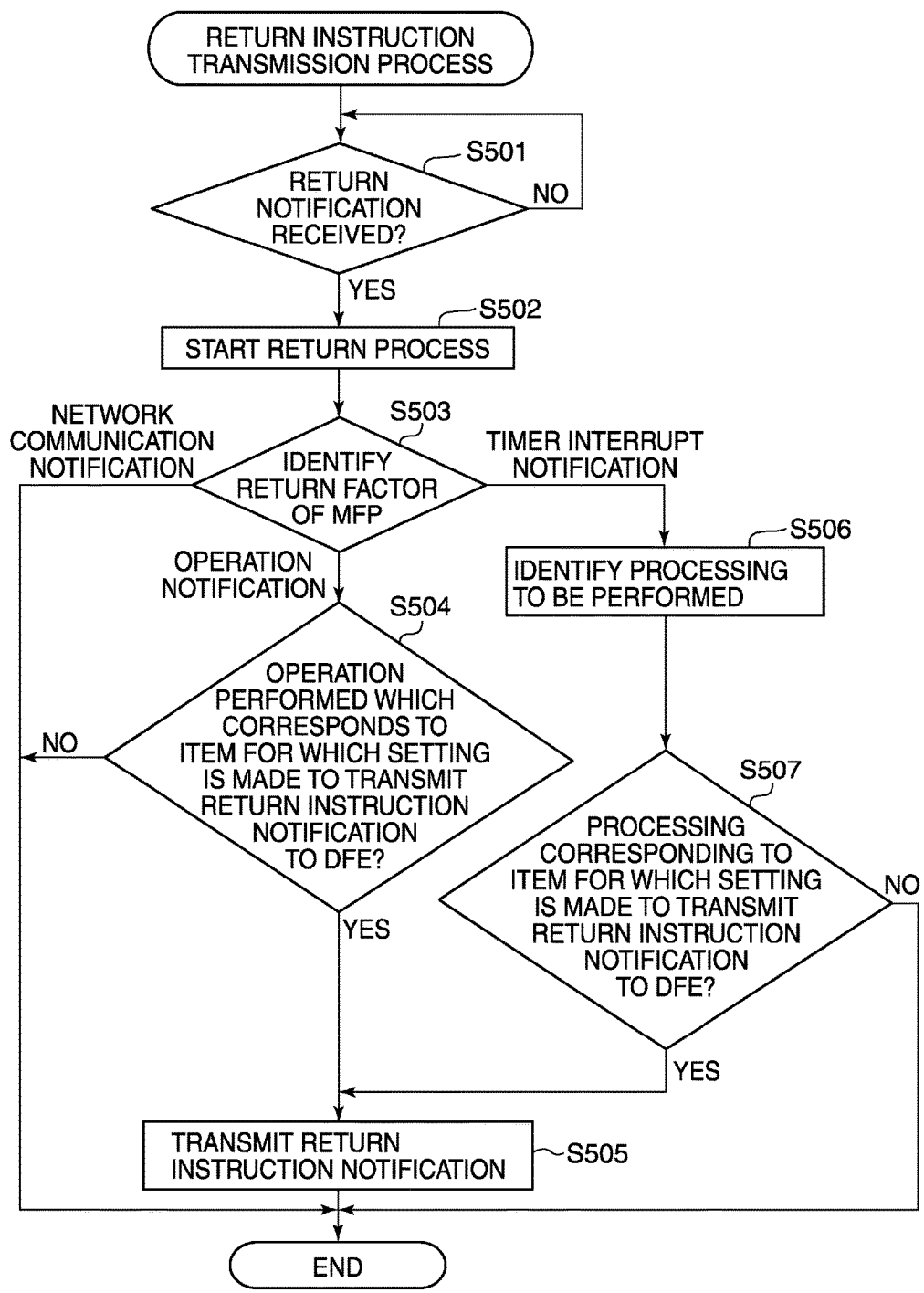
FIG. 5 is a flowchart of a return instruction transmission process performed by the MFP.

FIG. 5 is a flowchart of a return instruction transmission process performed by the MFP 101 appearing in FIG. 1.

The return instruction transmission process shown in FIG. 5 is performed according to programs stored in the HDD 211, which are executed by the CPU 212 of the MFP 101. Note that a description is given assuming that the MFP 101 is in the power-saving mode at the start of the return instruction transmission process.

Referring to FIG. 5, first, the CPU 212 waits until a notification for causing the MFP 101 to return from the power-saving mode to the normal mode (hereinafter simply referred to as the "return notification for the MFP 101") is received (step S501). In the present embodiment, examples of the return notification for the MFP 101 include a notification associated with a user operation of the console section 201 (hereinafter simply referred to as the "operation notification of the console section 201"), a notification indicating that data has been received by the network interface 214 via the internal LAN 105 (hereinafter simply referred to as the "network communication notification"), and the timer interrupt notification transmitted from the RTC 202. Upon receipt of the return notification for the MFP 101 (YES to the step S501), the CPU 212 starts a return process for causing the MFP 101 to return from the power-saving mode to the normal mode (step S502). When the return process is started, the CPU 212 controls the power supply controller 215 to cause electric power to be supplied to the components, such as the scanner section 203, the sheet feeding device 205, the printer section 206, and the sheet discharging device 207, which are used in the normal mode. This causes the MFP 101 to return from the power-saving mode to the normal mode.

Then, the CPU 212 analyzes the return notification for the MFP 101 to identify a return factor which has caused the MFP 101 to return from the power-saving mode to the normal mode (step S503) (operation of an identification unit). More specifically, it is determined which of the operation notification of the console section 201, the network communication notification, and the timer interrupt notification, the return notification is.

If it is determined in the step S503 that the return notification is the operation notification of the console section 201, the CPU 212 determines whether or not the operation of the console section 201 corresponds to an item of transmission setting information 700 stored in advance and described hereinafter, for which a setting is made so as to transmit the return instruction notification to the DFE 102 (step S504). Here, in the present embodiment, when the MFP 101 is in the power-saving mode, an operation screen 600 shown in FIG. 6 is displayed on the console section 201. The operation screen 600 contains a copy button 601 for performing copy processing, a send button 602 for transmitting e.g. scan image data generated by scan processing, to the DFE 102, a box button 603 for storing e.g. the scan image data in the HDD 211 or the like, a print button 604 for performing print processing, a FAX button 605 for performing facsimile communication, a scanner button 606 for performing scan processing, a web button 607 for performing web communication via the external LAN 107, an external controller button 608 for displaying various information on the DFE 102 and the like, and a settings button 609 for configuring various settings of the MFP 101. When any of the above-mentioned buttons is selected and pressed by the user, a configuration screen is displayed according to the pressed button, and the operation notification of the console section 201, including information indicative of the pressed button, is transmitted from the console section 201 to the CPU 212. In the present embodiment, by processing associated with each of the send button 602 and the external controller button 608, the MFP 101 performs data communication with the DFE 102 in order to obtain various information from the DFE 102. Further, by processing associated with the web button 607, the MFP 101 performs data communication with the DFE 102 in order to perform data communication with an apparatus, such as the client PC 103 or 104, connected to the DFE 102, via the external LAN 107. That is, the processing associated with each of the send button 602, the web button 607, and the external controller button 608 requires the data communication between the MFP 101 and the DFE 102. On the other hand, processing associated with each button other than the send button 602, the web button 607, and the external controller button 608 does not require the data communication between the MFP 101 and the DFE 102.

Further, in the present embodiment, the transmission setting information 700, shown in FIG. 7, for determining whether or not to transmit the return instruction notification to the DFE 102 is stored in advance e.g. in the HDD 211. The transmission setting information 700 contains items of settings associated with the buttons displayed on the operation screen 600 shown in FIG. 6 as to whether or not to transmit the return instruction notification to the DFE 102. For example, the setting of transmitting the return instruction notification to the DFE 102 is made only for each of "SEND" as an item associated with the send button 602, "WEB" as an item associated with the web button 607, and "Display of external controller status screen" as an item associated with the external controller button 608. On the other hand, the setting of not transmitting the return instruction notification to the DFE 102 is made for each of items other than the above-mentioned "SEND", "WEB", and "Display of external controller status screen". That is, in the present embodiment, the setting of not transmitting the return instruction notification to the DFE 102 is made for the items associated with processing which does not require the data communication between the MFP 101 and the DFE 102.

If it is determined in the step S504 that the operation of the console section 201 corresponds to an item of the transmission setting information 700 for which the setting is made so as to transmit the return instruction notification to the DFE 102, the CPU 212 transmits the return instruction notification to the DFE 102 (step S505), followed by terminating the present process.

If it is determined in the step S503 that the return notification is the timer interrupt notification, the CPU 212 identifies processing to be performed after issuance of the timer interrupt notification by the RTC 202 (step S506). Then, the CPU 212 determines whether or not the processing identified based on the transmission setting information 700 in the step S506 corresponds to an item for which the setting is made so as to transmit the return instruction notification to the DFE 102 (step S507).

If it is determined in the step S507 that the processing identified in the step S506 corresponds to an item for which the setting is made so as to transmit the return instruction notification to the DFE 102, the CPU 212 executes the step S505, followed by terminating the present process.

If it is determined in the step S503 that the return notification is the network communication notification, if it is determined in the step S504 that the operation of the console section 201 corresponds to an item for which the setting is made so as not to transmit the return instruction notification to the DFE 102, or if it is determined in the step S507 that the processing identified in the step S506 corresponds to an item for which the setting is made so as not to transmit the return instruction notification to the DFE 102, the CPU 212 terminates the present process without transmitting the return instruction notification. That is, in the present embodiment, if the return factor which has caused the MFP 101 to shift from the power-saving mode to the normal mode corresponds to an item of the transmission setting information 700, for which the setting is made so as not to transmit the return instruction notification to the DFE 102, i.e. a factor concerning processing which does not require the data communication between the MFP 101 and the DFE 102, the MFP 101 does not transmit the return instruction notification to the DFE 102.

Figure 8:
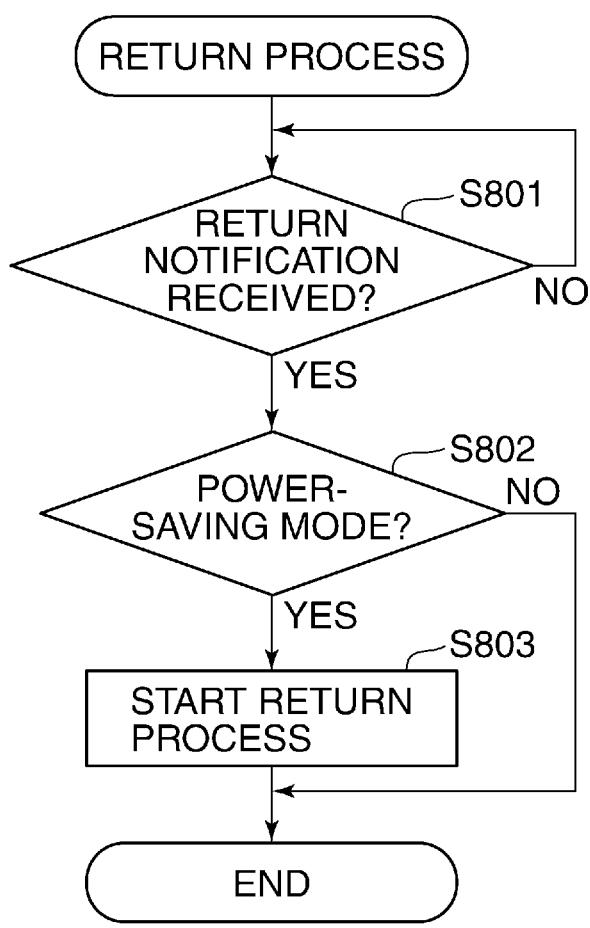
FIG. 8 is a flowchart of a mode return process performed by the DFE.

FIG. 8 is a flowchart of a mode return process performed by the DFE 102 appearing in FIG. 1.

The process shown in FIG. 8 is performed according to programs stored in the HDD 230, which are executed by the CPU 231 of the DFE 102.

Referring to FIG. 8, first, the CPU 231 waits until a return notification for the DFE 102, which is a notification for causing the DFE 102 to return from the power-saving mode to the normal mode, is received (step S801). In the present embodiment, examples of the return notification for the DFE 102 include a notification of user operation of the console section 221, a return instruction notification transmitted from the internal network interface 224, and a notification indicative of receipt of data via the external LAN 108. Upon receipt of the return notification for the DFE 102 (YES to the step S801), the CPU 231 determines whether or not the DFE 102 is in the power-saving mode (step S802).

If it is determined in the step S802 that the DFE 102 is in the power-saving mode, the CPU 231 starts a return process for causing the DFE 102 to return from the power-saving mode to the normal mode (step S803). When the return process of the DFE 102 is started, the CPU 231 controls the power supply controller 229 to cause electric power to be supplied to components to which power supply was stopped during the power-saving mode. This causes the DFE 102 to return from the power-saving mode to the normal mode. After thus executing the step 803, the CPU 231 terminates the present process.

If it is determined in the step S802 that the DFE 102 is not in the power-saving mode, the CPU 231 terminates the present process without performing the return process.

According to the above-described embodiment, a return factor which has caused the MFP 101 to shift from the power-saving mode to the normal mode is identified, and if the identified return factor corresponds to one of the items of the transmission setting information 700 stored in advance, for which the setting is made so as not to transmit the return instruction notification to the DFE 102, the return instruction notification is not transmitted from the MFP 101 to the DFE 102. As a consequence, even when the MFP 101 shifts from the power-saving mode to the normal mode, if the above-described return factor corresponds to an item of the transmission setting information 700, for which the setting is made so as not to transmit the return instruction notification to the DFE 102, the return instruction notification is not transmitted from the MFP 101 to the DFE 102. Therefore, the DFE 102 is not always caused to shift from the power-saving mode to the normal mode, whereby it is possible to prevent the DFE 102 from unnecessarily shifting from the power-saving mode to the normal mode, which makes it possible to more efficiently reduce power consumption.

Further, according to the above-described embodiment, if the identified return factor is a factor concerning processing which does not require the data communication between the MFP 101 and the DFE 102, the return instruction notification is not transmitted from the MFP 101 to the DFE 102. That is, in the case of processing which can be performed by the MFP 101 alone, the return instruction notification is not transmitted from the MFP 101 to the DFE 102, so that it is possible to prevent the DFE 102 from unnecessarily shifting from the power-saving mode to the normal mode, without hindering the MFP 101 from performing various kinds of processing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-009478 filed Jan. 21, 2015 which is hereby incorporated by reference herein in its entirety.

What is claimed is:

1. A communication system comprising:
an image forming apparatus operable in a first power mode and a second power mode in which power consumption is lower than power consumption in the first power mode and greater than power consumption in a power off state; and
an image processing apparatus operable in a third power mode and a fourth power mode in which power consumption is lower than power consumption in the third power mode;
wherein the image forming apparatus includes:
a plurality of wake-up devices, each of the plurality of wake-up devices outputs a wake-up signal;
a first controller that receives the wake-up signal, shifts the image forming apparatus from the second power mode to the first power mode based on the wake-up signal, and identifies a wake-up device which output the received wake-up signal; and
a first network interface that transmits a predetermined instruction to the image processing apparatus in a case where the identified wake-up device is a predetermined device,
wherein the image processing apparatus includes:
a second network interface that receives the predetermined instruction from the image forming apparatus; and
a second controller that shifts the image processing apparatus from the fourth power mode to the third power mode based on the predetermined instruction, and
wherein one of the plurality of wake-up devices is a modem, and the first network interface does not transmit the predetermined instruction to the image processing apparatus on the basis that the identified wake-up device is the modem.

2. The communication system according to claim 1, wherein one of the plurality of the wake-up devices is a display, and the first network interface transmits the predetermined instruction to the image processing apparatus on the basis that the identified wake-up device is the display and a predetermined user operation occurred using the display.

3. The communication system according to claim 1, wherein one of the plurality of wake-up devices is a timer, and the first network interface does not transmit the predetermined instruction to the image processing apparatus on the basis that the identified wake-up device is the timer.

4. The communication system according to claim 1,
wherein the second controller generates image data, and the second network interface transmits the image data to the image forming apparatus, and
wherein the image forming apparatus includes a printer that prints an image on a sheet based on the image data transmitted by the second network interface.

5. An image forming apparatus, operable in a first power mode and a second power mode in which power consumption is lower than power consumption in the first power mode and greater than power consumption in a power off state, that performs data communication with an image processing apparatus operable in a third power mode and a fourth power mode in which power consumption is lower than power consumption in the third power mode, the image forming apparatus comprising:
a plurality of wake-up devices, each of the plurality of wake-up devices outputs a wake-up signal;
a controller that receives the wake-up signal, shifts the image forming apparatus from the second power mode to the first power mode based on the wake-up signal, and identifies a wake-up device which output the received wake-up signal; and
a first network interface that transmits a predetermined instruction to the image processing apparatus in a case where the identified wake-up device is a predetermined device,
wherein the image processing apparatus receives the predetermined instruction from the image forming apparatus, and is shifted from the fourth power mode to the third power mode based on receipt of the predetermined instruction, and
wherein one of the plurality of wake-up devices is a modem, and the first network interface does not transmit the predetermined instruction to the image processing apparatus on the basis that the identified wake-up device is the modem.

6. The image forming apparatus according to claim 5, wherein one of the plurality of the wake-up devices is a display, and the first network interface transmits the predetermined instruction to the image processing apparatus on the basis that the identified wake-up device is the display and a predetermined user operation occurred using the display.

* * * * *